United States Patent [19]

Ishihara et al.

[11] Patent Number: 5,273,839
[45] Date of Patent: * Dec. 28, 1993

[54] FUEL CELL GENERATOR

[75] Inventors: Takeshi Ishihara, Toyoake; Keiji Matsuhiro, Nagoya, both of Japan

[73] Assignee: NGK Insulators, Ltd., Japan

[*] Notice: The portion of the term of this patent subsequent to Feb. 23, 2010 has been disclaimed.

[21] Appl. No.: 983,253

[22] Filed: Nov. 30, 1992

Related U.S. Application Data

[63] Continuation of Ser. No. 559,091, Jul. 30, 1990, abandoned.

[30] Foreign Application Priority Data

Jul. 28, 1989 [JP] Japan .................. 1-194319

[51] Int. Cl.$^5$ ................ H01M 8/10; H01B 1/02
[52] U.S. Cl. ................ 429/34; 429/31; 429/32
[58] Field of Search ................ 429/31, 32, 34

[56] References Cited

U.S. PATENT DOCUMENTS

| | | | |
|---|---|---|---|
| 3,311,504 | 3/1967 | Johnson | 429/31 |
| 4,395,468 | 7/1983 | Isenberg | 429/31 |
| 4,490,444 | 12/1984 | Isenberg | 429/31 |
| 4,699,852 | 10/1987 | Yokoyama et al. | 429/31 |
| 4,833,045 | 5/1989 | Pollack et al. | 429/31 |
| 4,895,576 | 1/1990 | Pal et al. | 429/31 |
| 5,009,763 | 4/1991 | Hise | 429/31 |

FOREIGN PATENT DOCUMENTS

| | | | |
|---|---|---|---|
| 0055016 | 6/1982 | European Pat. Off. | 429/31 |
| 1148581 | 4/1969 | United Kingdom . | |
| 2148044 | 5/1985 | United Kingdom . | |

Primary Examiner—Asok Pal
Attorney, Agent, or Firm—Parkhurst, Wendel & Rossi

[57] ABSTRACT

A fuel cell generator including arrays of a plurality of fuel cell units each including a solid electrolyte partition, a fuel electrode provided on one side of the solid electrolyte partition, an air electrode provided on the other side of the solid electrolyte partition, and an inner space having opposite open ends. The end openings of the inner spaces of the fuel cell units are opposed to each other and a fuel gas supply tube or oxidizing gas supply tube is extended through the inner spaces from a fuel gas supply inlet or oxidizing gas supply inlet. A desired long array can be provide by changing the number of short fuel cell units in the array to thereby easily limit thermal gradient in each fuel cell unit to improve electricity generating efficiency of the whole fuel cell generator.

11 Claims, 8 Drawing Sheets

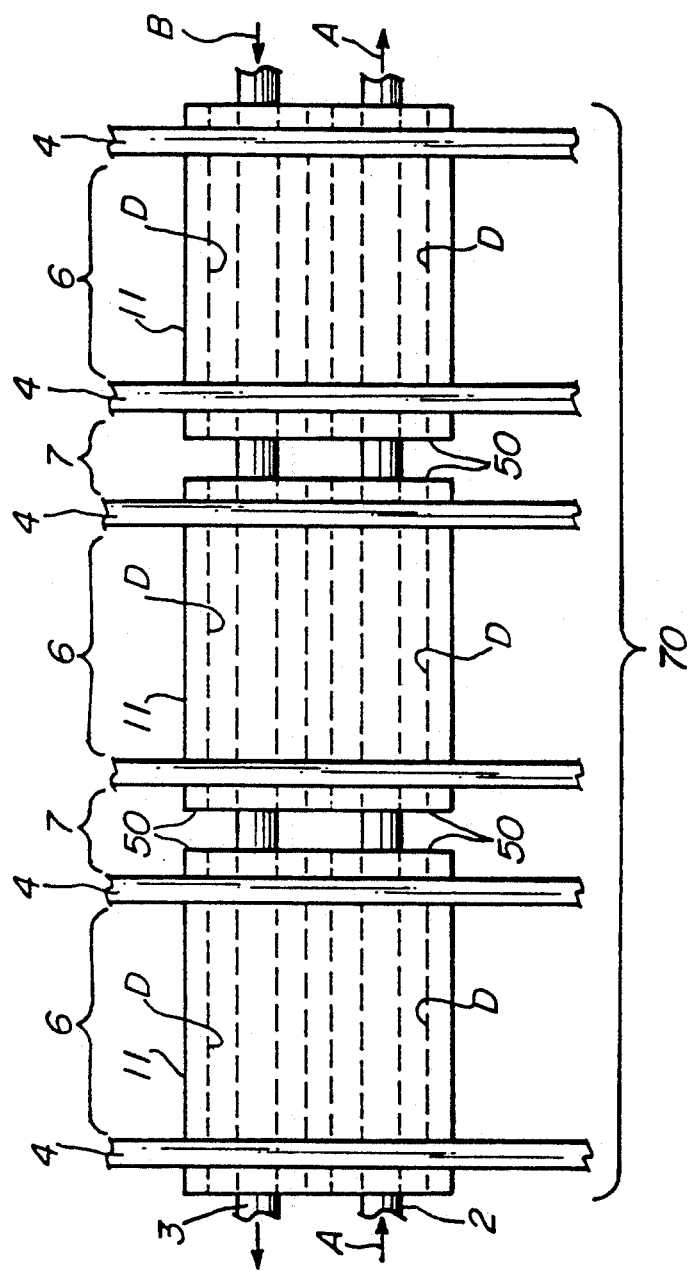

FIG_8
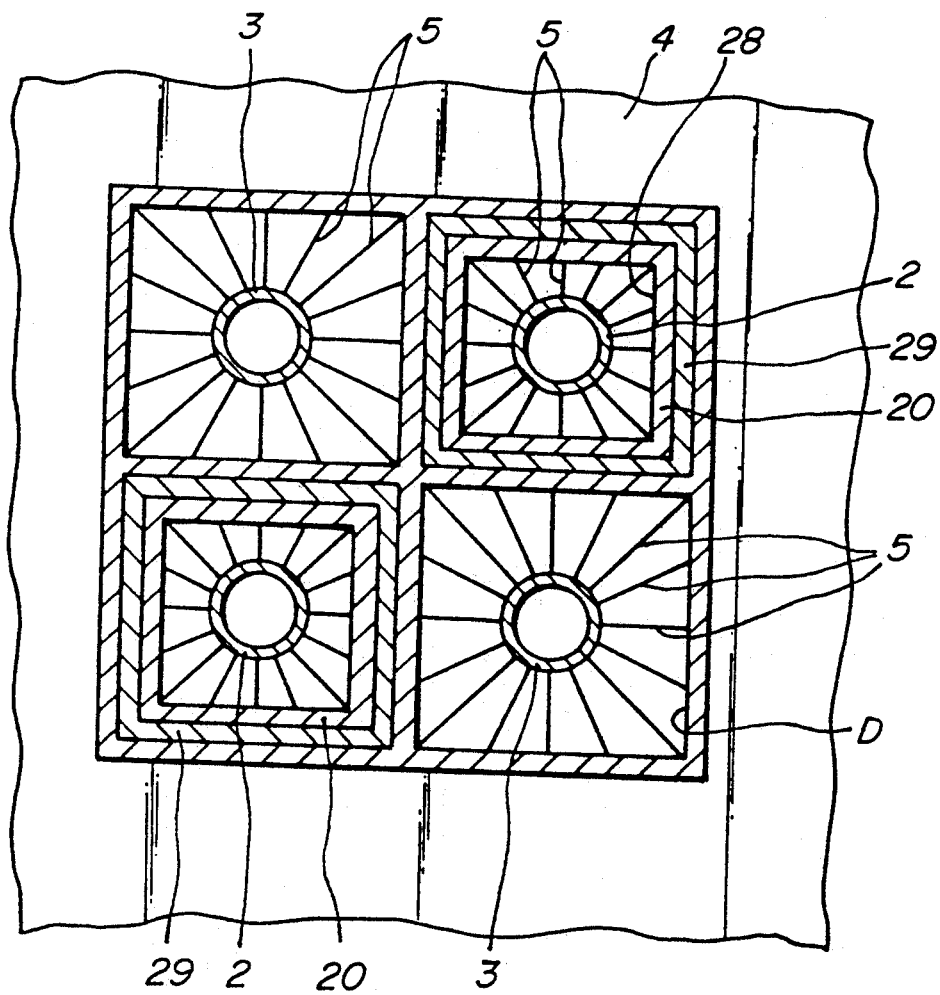

FUEL CELL GENERATOR

This is a continuation of application Ser. No. 07/559,091 filed Jul. 30, 1990, now abandoned.

FIELD OF THE INVENTION

1. Field of the Invention

The present invention relates to a fuel cell generator.

2. Related Art Statement

A fuel cell generator has recently been remarkably noted as an electricity generator. The fuel cell generator is a system which can directly convert chemical energy of fuel into electric energy, and does not receive a condition of Carnot's cycle, so as to have an essentially high energy conversion efficiency, is capable of versatile use of fuel (naphtha, natural gas, methanol, coal modified gas, heavy oil and the like), is low in environmental pollution, and its efficiency is affected by the scale of the electricity generation system, so that the system is an extremely promising technique.

Particularly, a solid electrolyte fuel cell (hereinafter call SOFC for short) is operated at a high temperature of 1000° C., so that an electric reaction is highly active, a noble metal catalyst such as expensive platinum is never required, polarization is small, output voltage is comparatively high, and therefore energy conversion efficiency is remarkably higher than that of other type fuel cells Moreover, since a structural material is all constructed with a solid, the solid electrolyte fuel cell has stability and long life.

The SOFC unit consists generally of an air electrode, a solid electrolyte and a fuel electrode Moreover, a tubular fuel cell unit with a closed end has been used as the cylindrical SOFC unit. In such a tubular fuel cell unit, air is supplied to the internal air electrode through an air supply tube and fuel gas is supplied to the external fuel electrode from an adjacent fuel gas supply chamber.

In order to increase efficiency of electricity generation, the tube of the cell unit is required to be long so as to increase the electricity generating area. However, when a one end closed tubular SOFC unit has a long length, the temperature gradient and current gradient is large and then the efficiency of electricity generation is affected That is, the fuel gas still has a high concentration in the vicinity of a fuel gas introducing portion and then electrochemical reaction is active to raise the temperature of the electrode. Therefore the reaction becomes more active by this temperature rise. On the other hand, the fuel gas is substantially decreased at the another end, so that the electrochemical reaction is inactive and the temperature of the electrode is low. Therefore the electrochemical reaction becomes more inactive Moreover, the decreased fuel gas contains a considerable amount of $CO_2$ and water vapor. Therefore, the $CO_2$ and water vapor deposit on the surface of the electrode to prevent the electrochemical reaction, thereby further lowering the temperature. This tendency is more vigorously developed as the tubular cell element becomes longer.

Furthermore, high technique is required to uniformly mold a one end closed tube having one closed end of ceramic material, so that it has been difficult to mold such a one end closed long tubular cell unit

SUMMARY OF THE INVENTION

It is an object of the invention to provide a fuel cell generator adapted for limiting the thermal gradient to improve the electricity generating efficiency, and to solve the above mentioned difficulty in producing a long ceramic fuel cell.

According to the present invention, there is provided a fuel cell generator comprising arrays of a plurality of cylindrical or honeycomb shaped fuel cell units each including a solid electrolyte partition, a fuel electrode provided on one side of the solid electrolyte partition, an air electrode provided on the other side of the solid electrolyte partition, and an inner space having opened opposite ends, the end opening of the fuel cell units being opposed to each other, and a fuel gas supply tube or oxidizing gas supply tube being extended through the inner space from a fuel gas supply inlet or oxidizing gas supply inlet.

The term "inner space" means a space within a cylinder in a cylindrical fuel cell unit and a space in each hole of a honeycomb.

The description "the openings of adjacent fuel cell units being opposed to each other" means a case where the center axes of the openings are completely aligned as well as a case where the center axes of the openings are parallelly deviated from each other, but portions of the openings are opposed or a case where the axes of the openings are slightly inclined relative to each other, but the openings are opposed at an angle. The description further includes a case where the openings are opposed with a distance spaced from each other as well as a case where the openings are directly opposed without any space. Although the fuel gas is supplied to the internal space or spaces of the plurality of fuel cell units from the fuel gas supply tube and the oxidizing gas is supplied to the external space or spaces from the oxidizing gas supply tube, in case of the honeycomb type fuel cell unit, fuel gas may be supplied to some internal spaces from the fuel gas supply tube and oxidizing gas may be supplied to other internal space from the oxidizing gas supply tube.

BRIEF DESCRIPTION OF THE DRAWINGS

The present invention will be described in more detail by reference to embodiments in connection with the accompanying drawings, in which:

FIG. 7 is a fragmentary schematic plan view illustrating the fuel cell generator shown in FIG. 5; and FIG. 8 is a sectional view similar to FIG. 6 showing a further embodiment of the fuel cell generator of the present invention.

DETAILED EXPLANATION OF THE PREFERRED EMBODIMENTS

Figure 1:
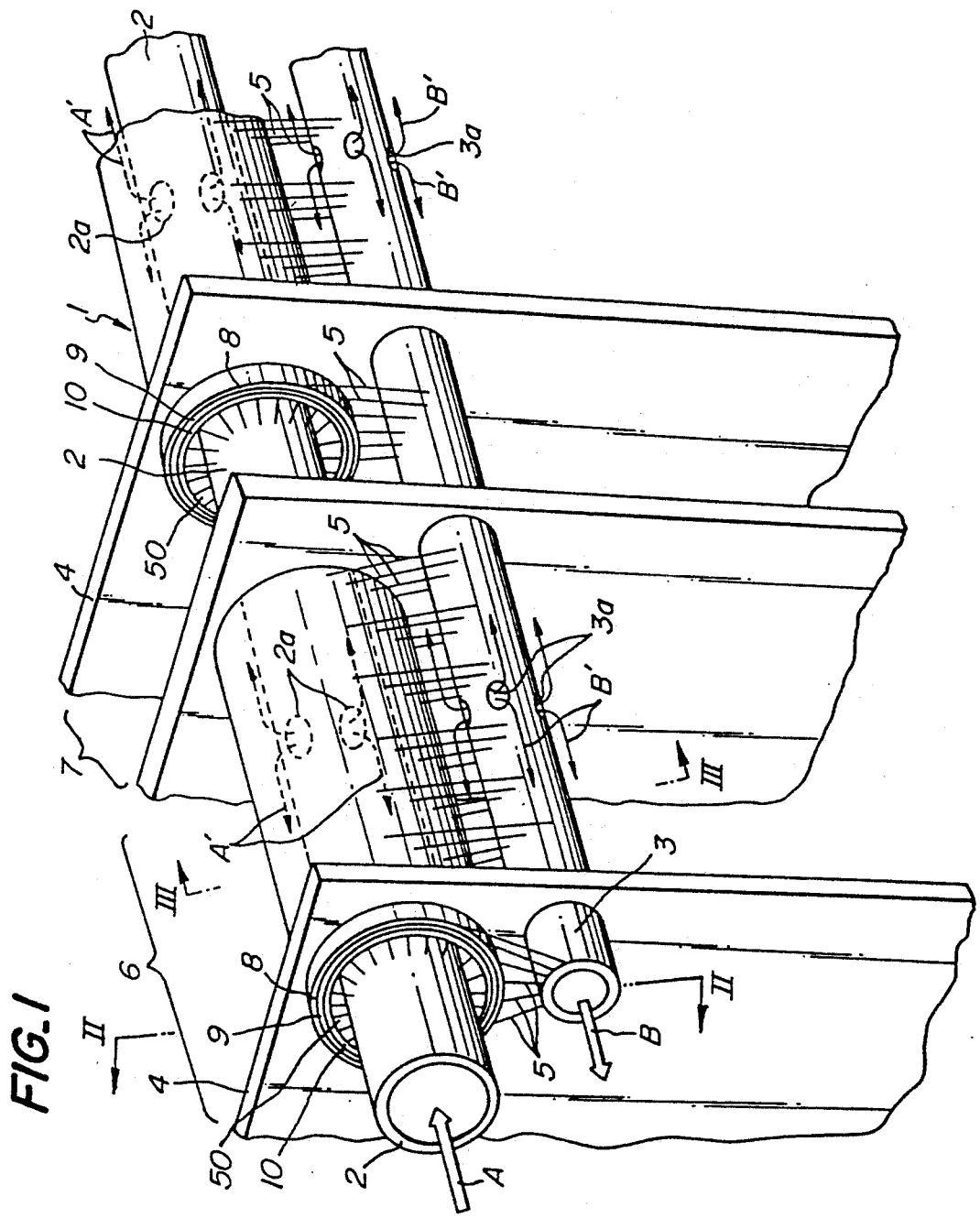
FIG. 1 is a fragmentary schematic perspective view, partly broken, illustrating an embodiment of the fuel cell generator according to the present invention.
Figure 2:
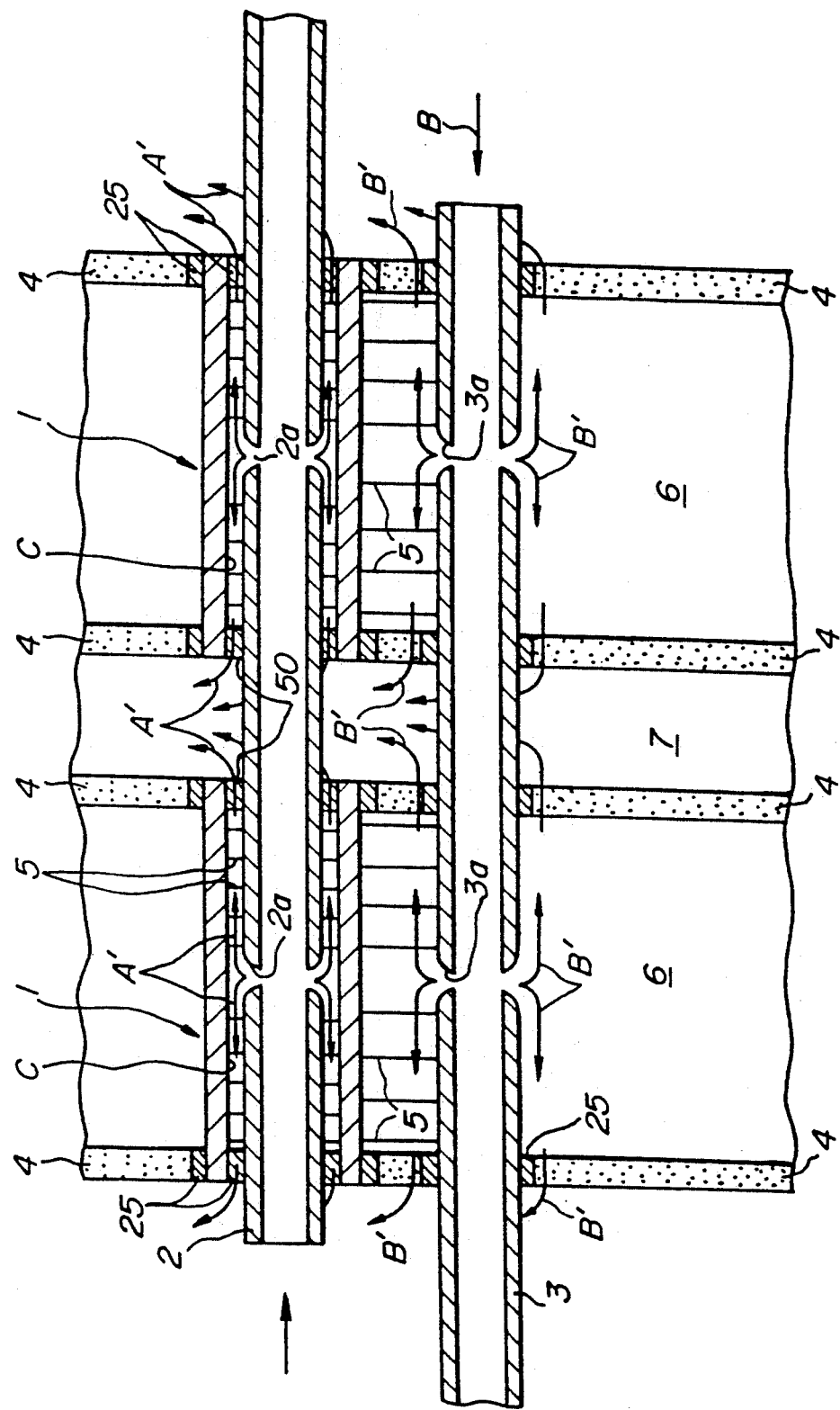
FIG. 2 is a sectional view taken along the line II—II of FIG. 1.
Figure 3:
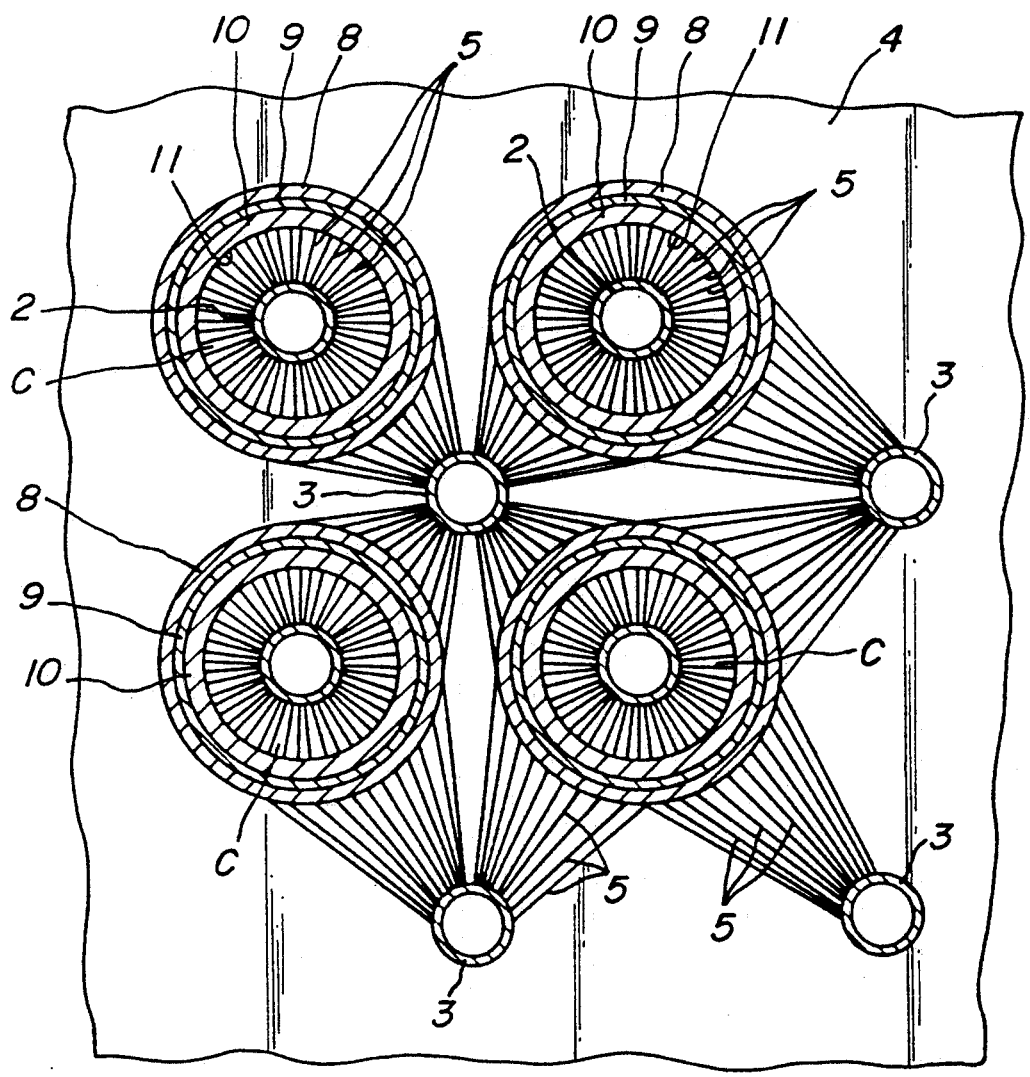
FIG. 3 is a sectional view taken along the line III—III of FIG. 1.

The present embodiment explains a fuel cell generator comprising a number of cylindrical SOFC units 1 each having opened opposite ends and being arranged in series and in parallel.

A plurality of porous barriers 4 are fixedly arranged parallelly spaced from each other to alternately define power generating chamber 6 and combustion product chamber 7. In the power generating chamber 6, opposite end portions of the SOFC units 1 are inserted into through-holes in the opposed porous barriers 4, respectively to support the SOFC unit 1 by the opposed porous barriers 4 in such a manner that the SOFC unit is extended over the power generating chamber 6. The SOFC unit 1 is thus positioned by the porous barriers 4 through a felt 25 (FIG. 1 omits to illustrate the felt 25) under a softly pressed condition. The end opening of the SOFC unit 1 is opened toward the combustion product chamber 7, and opposed to the end opening of adjacent SOFC unit 1.

The SOFC unit 1 has such a construction that an air electrode film 10 is provided on the inner peripheral surface of a cylindrical solid electrolyte partition film 9 and a fuel electrode film 8 is provided on the outer peripheral surface of the partition film. The air electrode film 8 can be formed with doped or undoped $LaMnO_3$, $CaMnO_3$, $LaNiO_3$, $LaCrO_3$ and the like, and strontium-added $LaMnO_3$ is preferable. The solid electrolyte partition film can generally be formed of yttria stabilized zirconia and the like. The fuel electrode is generally a nickel-zirconia cermet or cobalt zirconia cermet.

Figure 4:
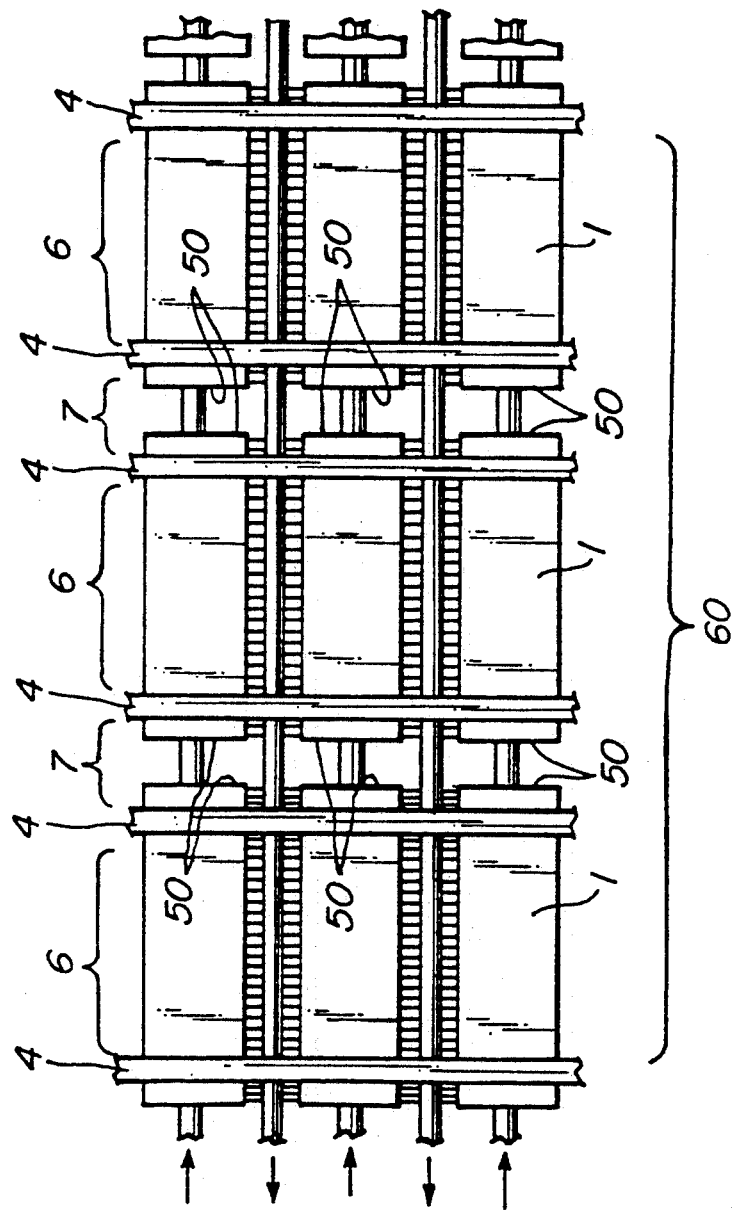
FIG. 4 is a fragmentary schematic plan view illustrating the fuel cell generator shown in FIG. 1.

A plurality of such cylindrical SOFC units are arranged in series in the transverse direction in the drawing as particularly shown in FIG. 4, such as to oppose the opening 50 of each cell unit to the opening of the adjacent cell unit to form arrays 60 of the SOFC units. In the drawing, there are three SOFC units in each array 60, but not limited to three. Also any numbers of arrays 60 of the SOFC units may be arranged in parallel side by side.

Through the internal spaces "C" of the SOFC units belonging to an array is extended a electrical conductive oxidant gas supply tube 2 (which is preferably made of heat resistant metal). Each of the SOFC units is further supported near the opening 50 by a felt 25 interposed between each SOFC unit 1 and the electric conductive oxidant supply tube 2. A number of needle-like current collecting brushes 5 are fixed to the outer periphery of the oxidizing gas supply tube 2, and the free ends of needles of the brushes 5 are pressed against the electrode surface of the air electrode 10. The needles of the current collecting brush 5 preferably are made of heat resistant metal and have elasticity at high temperature of about 1000° C. The oxidizing gas supply tube 2 is provided with oxidizing gas supply inlets 2a at the central portion located within the power generating chamber 6.

Moreover, a conductive fuel gas supply tube 3 is passed through a plurality of power generating chambers 6 and combustion product chambers 7, and is provided at the outside of the cylindrical SOFC unit 1 in parallel to the conductive oxidizing gas supply tube. The conductive fuel gas supply tube 3 preferably is made of heat resistant metal, and has fuel gas supply inlets 3a opened within the power generating chamber 6. On the surface of the conductive fuel gas supply tube 3 are also fixed a number of needle-like current collecting brushes 5, and free ends of needles of the brushes 5 are urgedly contacted with the electrode surface of the fuel electrode 8. From the outer periphery of one conductive fuel gas supply tube 3 are extended needle-like current collectors 5 in four directions for example, and four SOFC units 1 are electrically connected to one conductive fuel gas supply tube.

An oxygen-containing gas such as air is supplied to the conductive oxidizing gas supply tube 2 as shown by an arrow "A", and discharged from the oxidizing gas outlets 2a to the inner space C within the cell unit as shown by an arrow "A'", dividing into two directions. Moreover, the oxidizing gas is sent into the adjacent SOFC unit 1 in the same manner.

A fuel gas such as hydrogen, carbon monoxide and the like is forwarded within the conductive fuel gas supply tube 3 as shown by an arrow B, and discharged into the power generating chamber 6 from the fuel gas outlets 3a as shown by an arrow B' dividing into two directions in the same manner as described above.

The porous barrier 4 is designed to produce a slight differential pressure between the power generating chamber 6 and the combustion product chamber 7, to prevent a back flow of combustion products from the combustion product chamber 7. The oxidizing gas diminished after utilization for power generation flows from the opening of the cell unit 1 into the combustion product chamber 7 as shown by an arrow "A'". At the same time, the diminished fuel gas flows into the combustion product chamber 7 through the porous barrier 4 as shown by an arrow "B'", and burns by contacting with the oxidizing gas to therefore preheat the gas passing through the conductive gas supply tubes 2 and 3.

In the power generating chamber 6, the oxidizing gas generates oxygen ions at the interface between the air electrode 10 and the solid electrolyte 9. These oxygen ions move to the fuel electrode 8 through the solid electrolyte 9 and react with fuel to release electrons to the fuel electrode. The release electrons are collected to the conductive fuel gas supply tube 3 through the needle-like current collectors 5.

The fuel cell generator according to the present embodiment can perform the following effects. (1) A plurality of cylindrical SOFC units are arranged in series with openings 50 at opposite ends being opposed in each array 60 of SOFC units and are simultaneously operated. Accordingly, the SOFC unit 1 having a short length sufficient to prevent the thermal gradient from unduly increasing can be used to provide a desired long array 60 of SOFC units 1 by changing the number of the SOFC units in the array 60. Therefore, the whole length of the fuel cell generator can be made longer than that of the prior art to greatly increase the efficiency of electricity generation per unit volume of the fuel cell generator. Moreover, the thermal gradient in the SOFC unit can be limited since the length of one SOFC unit can be made short.

Furthermore, in the present embodiment, the electricity generating chamber is provided with th oxidizing gas supply port and the fuel gas supply port about the central portion of the chamber, as a result the gas flow from each of these supply ports is divided to flow in both opposite directions along the longitudinal direction of the electricity generating chamber. Accordingly, the distance of gas flow passage from the gas supply ports to the combustion product chamber is decreased to half the length of the generating chamber and then the controlling of the thermal gradient becomes easier way.

(2) The SOFC unit made of ceramics can be shorten, as a result difficulties in manufacturing the SOFC unit are avoided, while the length of the array of the SOFC units can be long by increasing the number of the SOF units in the array, if necessary, thereby increasing the efficiency of electricity generation.

Moreover, when the conductive gas supply tubes 2 and 3 (refer to FIG. 1) are made of heat resistant metal, continuous length tubes can be easily manufactured. It is very advantageous for manufacturing of the fuel cell generator.

(3) All the SOFC units in an array can be supplied with the oxidizing gas through a single conductive oxidizing gas supply tube 2 without the necessity of a plurality of supply tubes for individually supplying each SOFC unit as in the prior art.

It is possible to supply a fuel gas or oxidizing gas simultaneously into a number of power generating chambers 6 by simply sending the fuel gas or oxidizing gas into one conductive gas supply tube 2, 3, and it is not necessary to provide a fuel chamber and an oxidizing gas supply tube by every power generating chamber as the prior art.

(4) In the prior art, a plurality of SOFC units have been connected in series by connecting a fuel electrode of a cell unit to an air electrode of an adjacent cell unit through an intermediator or Ni felt and a plurality of SOFC units have been connected in parallel by interconnecting the fuel electrodes of adjacent cell units by means of Ni felts. The cylindrical SOFC units can receive electrons on an interface between the solid electrolyte and the air electrode and an interface between the solid electrolyte and the fuel electrode over the whole peripheral surface of the electrodes. However, the interconnector contacts with only one portion of the air electrode and also the Ni felts contact with only two or three portions and the generated electric current passes in the air electrode film and the fuel electrode film in parallel with the films toward the interconnector and the Ni felts. The air electrode film and the fuel electrode film then have large electric resistance, and as a result voltage loss is great and electricity generation efficiency is decreased. In order to decrease the electric resistance and to prevent the voltage loss from occurring in the electrode film, it is necessary to make the film thickness thick and to shorten the current passing distance in the electrode film to the interconnector and Ni felt, but a sufficient solution cannot be expected from the limitation in cell structure.

On the contrary, according to the present embodiment, needles of the needle-like current collector 5 contact the entire peripheral surfaces of the air electrode and the fuel electrode to collect current in a direction perpendicular relative to the electrode film, so that it is possible to minimize the voltage loss caused by the current passing through the air electrode film and fuel electrode film having high resistance as in the prior art. Therefore, the efficiency of electricity generation is strikingly improved.

Moreover, the conductive oxidizing gas supply tube 2 is extended through the inner space C and electrically connected to the air electrode 10 through the needles of the current collector 5. Therefore, current can be directly corrected through the conductive oxidizing gas supply tube and then no interconnector is required as in the prior art.

(5) An Ni felt has hitherto been used as a current collector, but the Ni felt has a disadvantage that it is deformed in use at high temperature to cause some contact failure with electrode and efficiency of electricity generation is lowered.

On the contrary, according to the present embodiment, the needle-like current collect is elastic and urgedly contacts the entire surface of the air electrode and the fuel electrode, so that the contact failure scarcely occurs and the efficiency of electricity generation is prevented from lowering.

The aforementioned embodiment can be modified as follows.

(a) In the aforementioned embodiment, the cylindrical SOFC units 1 in an array are arranged such that the end opening 50 of one SOFC unit 1 opposed to the end opening 50 of the adjacent SOFC unit 1 at the opposite side of the combustion product chamber. However, the adjacent cylindrical SOFC units 1 may be arranged end to end so as to closedly contact at each end and thereby two or more cylindrical SOFC units 1 may be integrally connected. In this case, no oxidizing gas is discharged from the inner space C at the closedly contacted ends of the cell units. Correspondingly, the generating chamber is continued in place of the combustion product chamber at these ends of the cell units. In such arrangement, the length of one generating chamber can be changed by selecting number of SOFC units to be integrally connected, if necessary. Furthermore, in case of a constant length of the generating chamber, the length of each SOFC unit can be changed if necessary.

The SOFC unit may be formed in various sectional shapes such as circular, rectangular, hexagon and the like. The conductive oxidizing gas supply pipe 2 and the conductive fuel supply pipe also may be variously modified relating to position, number and diameter of the oxidizing gas supply port 2a and the fuel gas supply port 3a.

(b) The cylindrical solid electrolyte partition may be provided with the air electrode on the outer peripheral surface and the fuel electrode on the inner peripheral surface thereof. In this case, the fuel gas is supplied to the inner space of the cell unit and the oxidizing gas is supplied to the outside of the cell unit.

(c) In FIGS. 1-4, the current collector may be a comb-like heat resistant metal electrode, or metal wool like current collector or the like and also other current collectors having low rigidity and elasticity instead of the needle-like current collector 5. Different current collectors can be used on the fuel electrode side and the air electrode side as a matter of course. Moreover, felt-like current collectors such as Ni felt can be used in lieu of the above to multipoint contact substantially all over the electrode surface.

(d) The porous barrier 4 is not particularly necessary, and the conductive gas supply tubes 2 and 3 may be fixed to support each SOFC unit 1 by means of the needle-like current collectors 5.

In addition to the porous barrier 4, a supporting or flowing baffle may be accommodated, or a sealed structure is not particularly required.

(e) The embodiment shown in FIG. 1 is arranged such that each cell unit is supported horizontally, but the whole system may be supported vertically at a predetermined angle.

(f) The above embodiment is also arranged such that the cylindrical solid electrolyte partition per se acts as a rigid body to self-support the cell elements, but the cell unit may be formed with use of a porous and conductive substrate tube.

Such porous conductive substrate can be made of Sr-doped $LaMnO_3$.

(g) In FIG. 1, instead of using the conductive fuel gas supply tube 3, a conventional fuel chamber may be provided to supply fuel to the power generating chamber 6. In this case, current collection on the air electrode side is carried out as shown in FIG. 1. Substantially all over the fuel electrode surface of each cell unit is made into contact with multipoint contact current collectors such as a brush of needle-like current collector 5, a comb-like heat resistant metal plate, heat resistant metal wool, heat resistant metal felt and the like. Fuel electrodes of each adjacent cell unit may be electrically connected by the multipoint contact collectors, and finally electrically connected to a metal plate to collect currents at the metal plate. In addition, an electrical load is applied between the conductive oxidizing gas supply tube 2 and the metal plate.

The multipoint contact current collector may be made of any other conductor such as conductive ceramic, ceramic-coated metal and the like rather than heat resistant metal.

Figure 5:
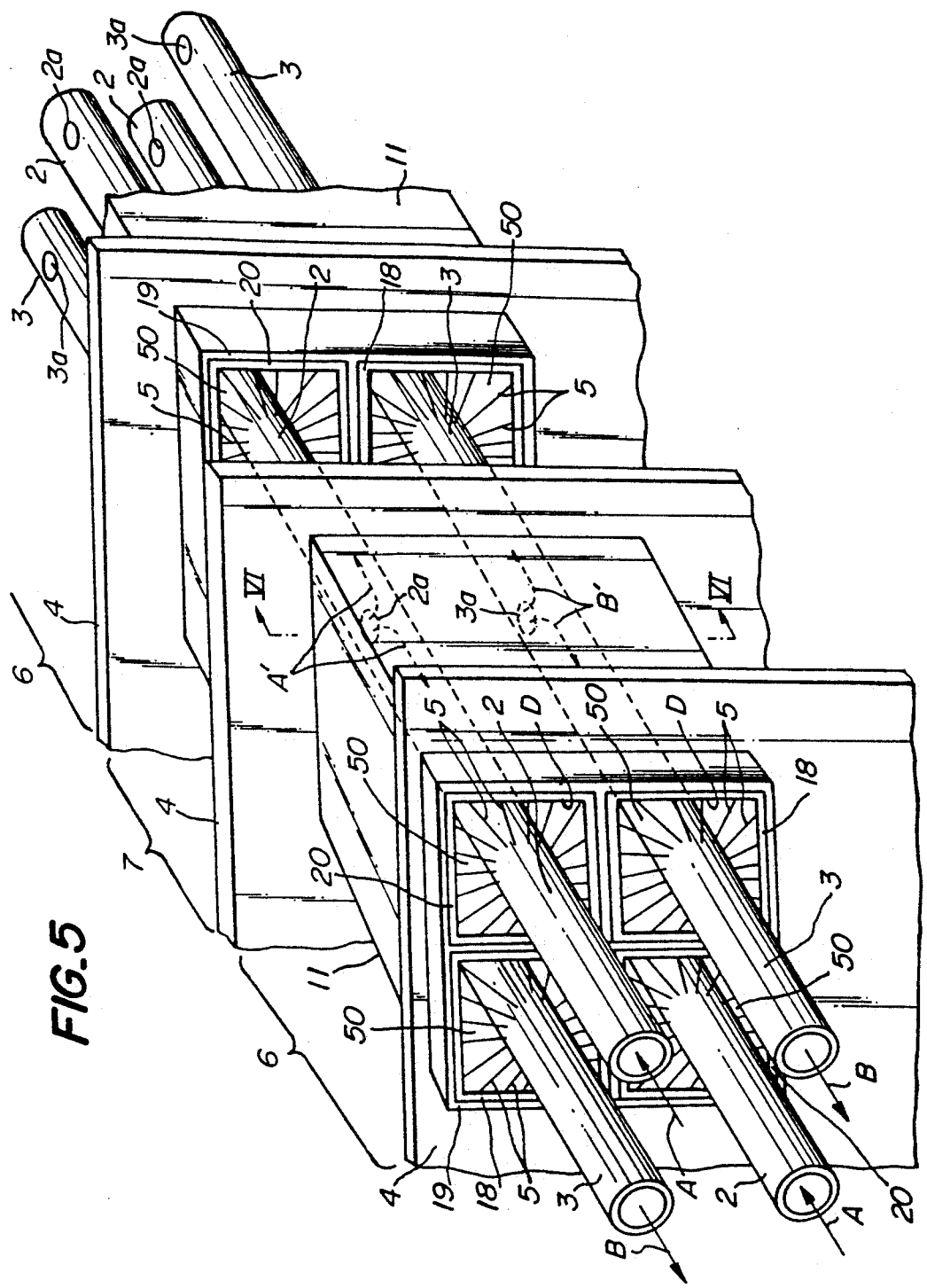
FIG. 5 is a fragmentary schematic perspective view of another embodiment of the fuel cell generator according to the present invention.
Figure 6:
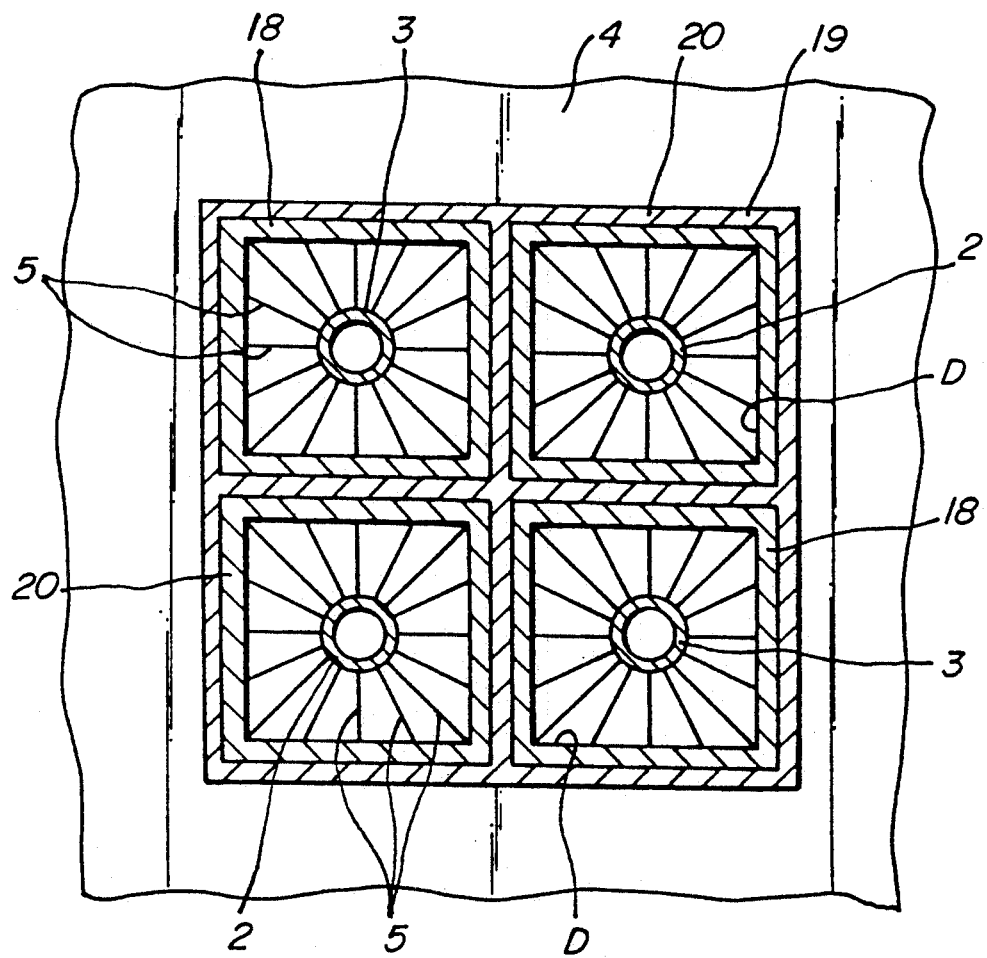
FIG. 6 is a sectional view taken along the line VI—VI of FIG. 5.

FIG. 5 is a perspective view, partly broken, showing one embodiment by applying the invention to a honeycomb shaped SOFC, and FIG. 6 is a perspective view taken along the line VI—VI of FIG. 5 and FIG. 7 is a partial plan view. In the present embodiment, like numerals are designated to the like functional members of the generator shown in FIG. 1.

In the present embodiment, a solid electrolyte partition 19 is formed into the so-called honeycomb shape of a square in cross section (for the sake of explanation, unit tubes are shown in two columns and two rows, but numbers of the unit tube may optionally be changed).

The solid electrolyte partition 19 forms a rectangular parallelopiped space (hole) in two columns and two rows, the inner peripheral surface of which are alternately provided fuel electrodes 18 and air electrodes 20 in checkered fashion. The end opening 50 of the inner space D of each cell unit is opposed to the corresponding end opening 50 of the adjacent cell unit to form an SOFC array 70 of a plurality of (only three are shown in FIG. 7) honeycomb SOFC units 11.

When the fuel electrode 18 is exposed on the surface of the inner space D, the conductive fuel gas supply tube 3 is inserted into the inner space D to extend through the inner spaces D of all the SOFC units 11 in an SOFC unit array. When the air electrode is exposed on the surface of the inner space D, the conductive oxidizing gas supply tube 2 is inserted into the inner space D to extend through the inner spaces D of all the SOFC units in an SOFC unit array. Thereby the fuel gas or oxidizing gas will be supplied to the inner space of individual SOFC unit 11 in the SOFC unit array 70 (one array) by supplying the fuel gas or oxidizing gas by one conductive fuel gas supply tube 3 or one conductive oxidizing gas supply tube 2. One end of the needle-like current collector 5 is urgedly contacted with the entire electrode surface of the fuel electrode 18 or the air electrode 20, and the other end of the needle-like current collector 5 is fixed to the conductive fuel gas supply tube 3 or the conductive oxidizing gas supply tube.

The other construction is substantially the same as the generator shown in FIG. 1, and the fuel electrode 18 is electrically connected to the conductive fuel gas supply tube 3 and the air electrode 20 to the conductive oxidizing gas supply tube 18 by the needle-like current collector 5 to collect current. Moreover, the oxidizing gas or fuel gas is discharged from an oxidizing gas outlet 2a or a fuel gas outlet 3a and then divided into two directions in each hole D as shown by an arrow A' or B' to flow into the combustion product chamber 7 from parts opened in each hole D, where the oxidizing gas and the fuel gas are mixed and the fuel gas is burnt.

The present embodiment can perform the above-described effects (1)–(5), and additionally, since the solid electrolyte partition 19 is a honeycomb structure, the structure is stronger than that of FIG. 1, so that even if the thickness of the solid electrolyte partition is made thinner than the prior one (such as less than 200 $\mu$m), practical strength can be obtained. Further, the partition area per unit volume is large.

Moreover, the SOFC per se with the use of a honeycomb solid electrolyte partition has been known, but in the known system, it is necessary to connect air electrodes and fuel electrodes one by one by lead wires, and to wire them to prevent short circuiting on the way, which was troublesome. On the contrary, in the present embodiment, current is collected by the conductive gas supply tube 2 or 3, so that there is no troublesome wiring and no danger of short circuiting.

The above-described modifications (a)–(g) are also possible in the present embodiment. Moreover, the cross section of each unit tube can be formed into any optional polygon, such as triangle, square, hexagon and the like, and the partition may be corrugated. When each unit hole is formed into triangle, square or hexagon, such shape is preferable to increase the partition area and furthermore electrode case is easily available and the hexagonal hole is easy to manufacture.

FIG. 8 is a cross-sectional view showing another fuel cell generator in the same manner as in FIG. 6.

In the present embodiment, the fuel electrode 28 is a honeycomb structure body. In unit tubes on upper left and lower right in FIG. 7 are exposed fuel electrodes 28 to the inner peripheral surfaces, the conductive fuel gas supply tube 3 is inserted into the holes, the free end of needle-like current collector 5 is urgedly contacted with the entire electrode surface of the fuel electrode 28, and the other end of the needle-like current collector 5 is fixed to the outer peripheral surface of the conductive fuel gas supply tube 3. In the drawing, moreover, in the unit tubes on upper right and lower left, the solid electrolyte film 29 is applied on the inner peripheral surface of the fuel electrode 28, and the air electrode 20 is applied on the inner peripheral surface. Moreover, the conductive oxidizing gas supply tube 2 is inserted into the hole D, the needle-like current collector is urgedly contacted with the entire electrode surface of the air electrode 20, and the other end of the needle-like current collector 5 is fixed to the outer peripheral surface of the conductive oxidizing gas supply tube 3. The other construction is the same as the fuel cell generator shown in FIGS. 5 and 6, and the same effect can be performed. Moreover, since the solid electrolyte film 29 is applied on the inner wall of the fuel electrode 28 of a honeycomb structure, the solid electrolyte film 29 does not require any strength as a structural member, and a thinner solid electrolyte film (such as about 50 $\mu$m) than the case of FIG. 5 can be manufactured. By making the solid electrolyte for passing oxygen ions therethrough thin, a passing distance of oxygen ions is made short, and efficiency of electricity generation can be improved further.

In the embodiment of FIG. 8, it can be possible to exchange the fuel electrode and the air electrode to form the air electrode of a honeycomb structure, and to form a solid electrolyte film and a fuel electrode film on the inner peripheral surface of the air electrode. In this case, in FIG. 7 for example, the air electrodes are exposed in the holes and the conductive oxidizing gas supply tubes are passed through holes in upper left and lower right unit tubes, while the fuel electrodes are exposed in the holes and the conductive fuel gas supply tubes are passed through the holes in upper right and lower left unit tubes.

According to the present invention, a fuel cell unit array is formed with a plurality of fuel cell units arranged in series in such a manner that the end openings of the adjacent fuel cell units are opposed to each other. Consequently, the length of the fuel cell unit array can be changed by changing the number of fuel cell units in the fuel cell unit array to increase the efficiency of electricity generation per volume of fuel cell generator. Furthermore, the length of each fuel cell unit can be made short to limit the temperature gradient and heat gradient in each fuel cell unit and to easily produce the fuel cell unit.

Moreover, the fuel gas and the oxidizing gas can be supplied to all the fuel cell units in each fuel cell unit array with a single conductive fuel gas supply tube and a single conductive oxidizing gas supply tube, respectively extending through a plurality of inner spaces of the fuel cell units in each fuel cell unit array. Therefore, it is not necessary to provide a plurality of supply tubes for individually supplying the fuel gas or oxidizing gas to the inner space of each fuel cell unit and a plurality of combustion product chambers for individually supplying the fuel gas so that it is possible to operate the fuel cell generator system in an easy and highly efficient manner.

What is claimed is:

1. A fuel cell generator comprising:
   a plurality of gas supply tubes arranged in an array; and
   a plurality of hollow fuel cells units, each comprising a solid electrolyte partition, a fuel electrode provided on one side of the solid electrolyte partition, an air electrode provided on the other side of the solid electrolyte partition, and an inner space defined by one of said fuel or air electrodes and open on opposite ends of the fuel cell unit;
   wherein each gas supply tube extends through the inner spaces of a plurality of said fuel cell units, such that the gas supply tube is radially inwardly spaced and separated from each fuel cell unit and adjacent fuel cell units are spaced apart from each other along the gas supply tube.

2. The fuel cell generator of claim 1, wherein said inner space is defined by said fuel electrode and said gas supply tube is a fuel gas supply tube.

3. The fuel cell generator of claim 1, wherein said inner space is defined by said air electrode and said gas supply tube is an oxidizing gas supply tube.

4. The fuel cell generator of claim 1, wherein said gas supply tube has a plurality of gas outlets in communication with the inner space of each fuel cell unit.

5. The fuel cell generator of claim 1, wherein said fuel cell units are cylindrical.

6. The fuel cell generator of claim 1, wherein said fuel cell units are linearly aligned along said gas supply tube.

7. The fuel cell generator of claim 1, wherein said fuel cell units comprise ceramic material.

8. The fuel cell generator of claim 1, wherein said gas supply tube comprises heat resistant metal.

9. A fuel cell generator comprising:
   a plurality of gas supply tubes arranged in an array, each supply tube having a plurality of gas outlets along the length thereof; and
   a plurality of hollow fuel cells units, each comprising a solid electrolyte partition, a fuel electrode provided on one side of the solid electrolyte partition, an air electrode provided on the other side of the solid electrolyte partition, and an inner space defined by one of said fuel or air electrodes and open on opposite ends of the fuel cell unit;
   wherein each gas supply tube extends through the inner spaces of a plurality of said fuel cell units, such that (i) the gas supply tube is radially inwardly spaced and separated from each fuel cell unit, (ii) adjacent fuel cell units are spaced apart from each other along the gas supply tube, and (iii) the gas outlets in the gas supply tube are aligned substantially at a midpoint along the inner space of each fuel cell unit.

10. A fuel cell generator comprising:
    a plurality of gas supply tubes arranged in an array; and
    a plurality of hollow fuel cells units, each comprising a honey-comb-shaped solid electrolyte partition defining at least two adjacent flow channels open on opposite ends of the fuel cell unit, a fuel electrode provided in a first of said two flow channels of the solid electrolyte partition, an air electrode provided in a second of said two flow channels of the solid electrolyte partition;
    wherein a gas supply tube extends through each flow channel of a plurality of said fuel cell units, such that the gas supply tube is radially inwardly spaced and separated from each fuel cell unit and adjacent fuel cell units are spaced apart from each other along the gas supply tube.

11. A fuel cell generator comprising:
    a plurality of gas supply tubes arranged in an array;
    a plurality of hollow fuel cells units, each comprising a solid electrolyte partition, a fuel electrode provided on one side of the solid electrolyte partition, an air electrode provided on the other side of the solid electrolyte partition, and an inner space defined by one of said fuel or air electrodes and open on opposite ends of the fuel cell unit;
    multipoint contact current collectors arranged between the gas supply tubes and each fuel cell unit;
    wherein each gas supply tube extends through the inner spaces of a plurality of said fuel cell units and is radially inwardly spaced and separated from each fuel cell unit by the multipoint contact current collectors, and adjacent fuel cell units are spaced apart from each other along the gas supply tube.

* * * * *